(12) United States Patent
Xu et al.

(10) Patent No.: US 11,117,074 B2
(45) Date of Patent: Sep. 14, 2021

(54) FLOATING SLUDGE DISCHARGE DEVICE FOR SQUARE SETTLING TANK

(71) Applicant: HOHAI UNIVERSITY, Nanjing (CN)

(72) Inventors: Ming Xu, Nanjing (CN); Jiashun Cao, Nanjing (CN); Xiaoxiao Shen, Nanjing (CN)

(73) Assignee: HOHAI UNIVERSITY, Nanjing (CN)

( * ) Notice: Subject to any disclaimer, the term of this patent is extended or adjusted under 35 U.S.C. 154(b) by 426 days.

(21) Appl. No.: 16/329,241

(22) PCT Filed: Nov. 8, 2018

(86) PCT No.: PCT/CN2018/114471
§ 371 (c)(1),
(2) Date: Feb. 28, 2019

(87) PCT Pub. No.: WO2019/214195
PCT Pub. Date: Nov. 14, 2019

(65) Prior Publication Data
US 2021/0252429 A1   Aug. 19, 2021

(30) Foreign Application Priority Data
May 11, 2018   (CN) .......................... 201810447862.7

(51) Int. Cl.
*B01D 21/24*   (2006.01)

(52) U.S. Cl.
CPC ..... *B01D 21/2438* (2013.01); *B01D 21/2444* (2013.01)

(58) Field of Classification Search
CPC ............ B01D 21/2433; B01D 21/2438; B01D 21/2444
USPC .......................... 210/523, 525, 527, 540, 775
See application file for complete search history.

(56) References Cited

U.S. PATENT DOCUMENTS

| | | | | |
|---|---|---|---|---|
| 1,918,742 A * | 7/1933 | Elrod | ..................... | B01D 21/18 210/525 |
| 3,121,680 A * | 2/1964 | Ciabattari | .......... | B01D 21/2438 210/525 |
| 3,540,588 A * | 11/1970 | Estabrook | .......... | B01D 21/2444 210/526 |
| 4,268,394 A * | 5/1981 | Wolfe | ................ | B01D 21/2433 210/525 |
| 4,514,303 A * | 4/1985 | Moore | ............... | B01D 21/2438 210/525 |
| 4,927,537 A * | 5/1990 | Meurer | .................. | B01D 21/20 210/527 |
| 9,352,250 B2 * | 5/2016 | Fujiwara | ............ | B01D 21/2438 |
| 2017/0252673 A1 * | 9/2017 | Heimdal | ............ | B01D 21/2444 |
| 2020/0038783 A1 * | 2/2020 | Kleinguetl | ......... | B01D 21/2438 |

* cited by examiner

*Primary Examiner* — Christopher Upton
(74) *Attorney, Agent, or Firm* — CBM Patent Consulting, LLC

(57) ABSTRACT

A floating sludge discharge device for a square settling tank, and belongs to the field of water treatment. In order to solve the problem of scraping of floating sludge in the square settling tank, by disposing a water outlet hole below a liquid level and designing a pulling barrel mechanism that changes its overall gravity by using secondary settlement water, to move up and down to pull a sludge scraping plate to move back and forth, the stretching-out end of the sludge scraping plate of a sludge scraping plate mechanism automatically goes deep into the liquid level and automatically lifts up when it returns.

7 Claims, 7 Drawing Sheets

FLOATING SLUDGE DISCHARGE DEVICE FOR SQUARE SETTLING TANK

This application is the U.S. national phase of International Application No. PCT/CN2018/114471 filed on 8 Nov. 2018 which designated the U.S. and claims priority to Chinese Application No. CN201810447862.7 filed on 11 May 2018, the entire contents of each of which are hereby incorporated by reference.

TECHNICAL FIELD

The present invention relates to a floating sludge discharge device for a square settling tank, and belongs to the field of water treatment.

BACKGROUND ART

Floating sludge often occurs on the surfaces of secondary settling tanks due to denitrification or sludge aging. Large and medium-sized sewage treatment plants in cities adopt circular tank surfaces, and sludge scraping bridges rotate along central axes to scrape floating sludge. However, the surfaces of the secondary settling tanks of integrated sewage treatment devices used in rural areas mostly are of square structures. Scraping of floating sludge of the secondary settling tanks has always been a difficult problem. Floating sludge in the secondary settling tanks seriously affects the quality of effluent.

SUMMARY OF THE INVENTION

Objective of the present invention: in order to solve the technical problems existing in the prior art, the present invention provides a floating sludge discharge device for a square settling tank. By providing a water outlet hole below a liquid level and designing a pulling barrel mechanism that changes its overall gravity by using secondary effluent, to move up and down to pull a sludge scraping plate to move back and forth, the stretching-out end of the sludge scraping plate of a sludge scraping plate mechanism automatically goes deep into the liquid level and automatically lifts up when it returns.

Technical solution: in order to realize the above-mentioned technical objective, the present invention provides a floating sludge discharge device for a square settling tank, including a pulling barrel mechanism, a sludge scraping plate mechanism, a pulling weight, a perforated water-penetrating plate structure and a floating sludge discharge structure, wherein, the perforated water-penetrating plate structure is disposed around the inner wall of the square settling tank, and the lower part of the perforated water-penetrating plate structure is uniformly provided with drain holes;

the sludge scraping plate mechanism spans over the perforated drain plate;

a pulley block is disposed on two sides of the square settling tank, and the pulling barrel mechanism is connected with a pulling rope A which is wound through the pulley block on one side and then is connected with the sludge scraping plate mechanism;

the sludge scraping plate mechanism is fixedly connected with a pulling rope B which is wound through the pulley block on the other side and then is connected with the pulling weight, such that the pulling barrel mechanism and the pulling weight are respectively disposed on two sides of the square settling tank;

the floating sludge discharge structure is disposed on the side, close to the pulling barrel mechanism, of the perforated water-penetrating plate structure, effluent in the secondary settling tank flows into the pulling barrel mechanism, and when the weight of the pulling barrel mechanism is greater than that of the pulling weight, effluent in the pulling barrel mechanism is drained out of the pulling barrel mechanism to realize the back-and-forth movement of the sludge scraping plate mechanism and scrape floating sludge into the floating sludge discharge structure, wherein settlement supernatant flows out through the drain holes below the liquid level of the perforated water-penetrating plate structure.

Specifically, the pulling barrel mechanism consists of a spiral water pipe, a water storage barrel, a water stop ball, an ejector rod, a water receiving bucket and a drain pipe; one end of the spiral water pipe is connected with the upper part of the water storage barrel, the other end extends to the bottom of the perforated water-penetrating plate structure, and the effluent in the secondary settling tank flows into the water storage barrel through the spiral water pipe; the bottom of the water storage barrel is a conical bottom, the conical bottom is provided with a circular hole, the diameter of the water stop ball is larger than the diameter of the circular hole and the water stop ball covers the circular hole; the water receiving bucket is disposed below the water storage barrel, and the drain pipe is communicated with the water receiving bucket and is disposed below the water receiving bucket; the ejector rod is disposed in the middle of the bottom of the water receiving bucket and directly faces the circular hole in the bottom of the water storage barrel; the effluent in the secondary settling tank flows into the water storage barrel through the spiral water pipe, when the weight of the water storage barrel is greater than that of the pulling weight, the water storage barrel moves down until the ejector rod ejects away the water stop ball, the water in the water storage barrel is rapidly drained into the water receiving bucket and is drained into a regulating tank at the front end of a sewage treatment process through the drain pipe, and the water storage barrel moves rapidly upwards to realize actions that the sludge scraping plate slowly scrapes sludge and rapidly returns to a starting position, wherein the upward and downward movement frequency of the water storage barrel depends on the flow rate of the spiral water pipe.

The drain pipe and the water receiving bucket are connected through a flange, the ejector rod is in the middle of the water receiving bucket, and circular flange bolt holes are disposed around.

The perforated water-penetrating plate structure comprises an inclined stand plate, a first stand plate, a first stand plate guide rail, a second stand plate, a third stand plate and a third stand plate guide rail, wherein the inclined stand plate, the first stand plate, the second stand plate and the third stand plate sequentially surround the inner wall of the square settling tank and are fixedly connected with the tank wall of the square settling tank through a flat plate in a horizontal direction, uniformly distributed drain holes are disposed in the lower part of each stand plate and have a diameter of 6-10 mm, the first stand plate guide rail and the third stand plate guide rail are respectively fixed above the first stand plate and the third stand plate, and the guide rails are square to facilitate load bearing and movement of the sludge scraping plate mechanism;

the sludge scraping plate mechanism comprises a double-limiting upper magnet arm, double-line sliding cylinders, a double-limiting ejector rod, a sludge scraping plate, a rotating sleeve, a fixed shaft and a double-limiting lower swing arm, wherein:

the number of the double-line sliding cylinders is two, the two double-line sliding cylinders are square and respectively sleeve the first stand plate guide rail and the third stand plate guide rail, the two double-line sliding cylinders are fixedly connected with each other through the fixed shaft, the rotating sleeve sleeves the fixed shaft, the double-limiting lower swing arm and the double-limiting upper magnet arm are respectively fixed at the two ends of the rotating sleeve, the sludge scraping plate is disposed in the middle of the rotating sleeve, the double-limiting ejector rod is fixed on the tank wall and penetrates through the sludge scraping plate through a perforation hole disposed in the surface of the sludge scraping plate, the double-limiting upper magnet arm is of a special-shaped T-shaped structure, the two ends of the T-shaped structure are respectively provided with a magnet, and magnets whose polarity is opposite to that of the magnets at the two ends of the T-shaped structure are also disposed at corresponding positions of the double-line sliding cylinders; the double-limiting lower swing arm and the double-limiting upper magnet arm are used for limiting the position of the sludge scraping plate, the sludge scraping plate is kept in a downward swinging state at a starting end and is lifted up slowly until it moves to the floating sludge guide plate, while moving towards the direction of the double-limiting ejector rod, the sludge scraping plate is kept in a lifted-up state, and while reaching the double-limiting ejector rod, the sludge scraping plate is downwards pressed and is kept in the downward swinging state;

at the starting position, the sludge scraping plate is on the side far away from the floating sludge discharge structure, the double-limiting ejector rod pushes the double-limiting lower swing arm, the double-limiting upper magnet arm attracts the corresponding magnet right below, the sludge scraping plate rotates anticlockwise, the stretching-out end of the sludge scraping plate goes deep into the liquid level, when the water storage barrel moves slowly downwards, the sludge scraping plate is pulled to scrape the floating sludge towards one side of the floating sludge discharge structure, when approaching the floating sludge guide plate, the sludge scraping plate conveys the floating sludge to the floating sludge guide plate to force the floating sludge to enter a floating sludge discharge trough, meanwhile, the upwards inclined floating sludge guide plate lifts up the sludge scraping plate, the sludge scraping plate rotates clockwise to force the rotating sleeve and the double-limiting upper magnet arm to rotate clockwise, when the sludge scraping plate is just on the upper edge of a floating sludge discharge trough, the magnet at the other end of the double-limiting upper magnet arm attracts the corresponding magnet on the double-line sliding cylinder, and at this moment the stretching-out end of the sludge scraping plate is 2-3 cm far away from the design liquid level; and the water in the water storage barrel is emptied, the water storage barrel is pulled by the weight to move up rapidly, the sludge scraping plate mechanism quickly floats back from the floating sludge discharge trough, and when the sludge scraping plate mechanism reaches the other end, the double-limiting ejector rod pushes the double-limiting lower swing arm, and the sludge scraping plate mechanism returns to the starting position.

The floating sludge discharge structure comprises a floating sludge guide plate, a floating sludge discharge pipe and a floating sludge discharge trough, the floating sludge discharge trough is fixed above the corresponding drain holes of the perforated water-penetrating plate structure, the upper edge of the floating sludge discharge trough is 2-3 cm higher than the design liquid level of the secondary settling tank, the floating sludge guide plate is an oblique plate, one side is below the design liquid level, and the other side is fixed on the upper edge of the floating sludge discharge trough to guide the floating sludge into the floating sludge discharge trough, and the floating sludge flows out of the floating sludge discharge pipe due to dead weight and enters a sludge storage tank.

An inclination angle of the floating sludge guide plate is 30-45°.

The pulley block comprises an outer wall weight-side horizontal-shaft fixed pulley, a water inlet-side vertical-shaft fixed pulley, a water outlet vertical-shaft fixed pulley and an outer wall pulling barrel-side horizontal-shaft fixed pulley, wherein the water inlet-side vertical-shaft fixed pulley and the water outlet vertical-shaft fixed pulley are respectively fixed at middle positions above the inclined stand plate and the second stand plate, so as to ensure that the pulling rope pulls the center position of the fixed shaft to control the pulling rope at the center position of the plane of a tank body and ensure that the fixing point of the pulling rope on the shaft is the center position of the shaft; the outer wall weight-side horizontal-shaft fixed pulley and the outer wall pulling barrel-side horizontal-shaft fixed pulley are respectively fixed on the outer wall of the square tank, located above the perforated water-penetrating plate structure and are used for pulling the sludge scraping plate to move back and forth.

Beneficial effects: compared with the prior art, the floating sludge discharge device for the square settling tank provided by the present invention is simple in structure, and less in energy consumption, can automatically scrape the sludge as long as water enters the secondary settling tank, and is suitable for use on a container integrated sewage treatment device.

DETAILED DESCRIPTION OF THE INVENTION

The present invention will be further described below with reference to the specific drawings.

Figure 1:
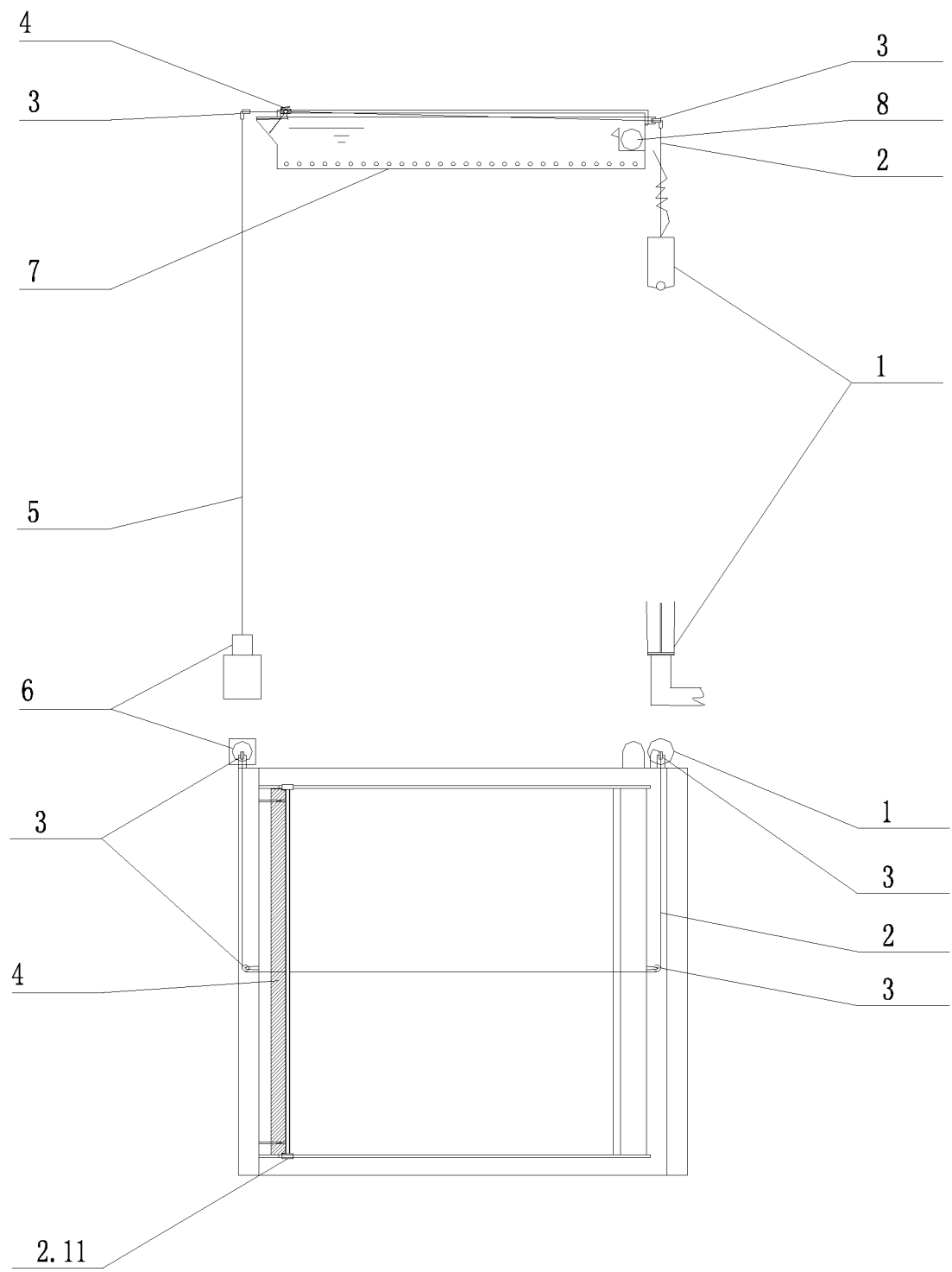
FIG. 1 is a structural schematic view of the present invention, wherein the upper view is a side view and the lower view is a top view.

As illustrated in FIG. 1, a floating sludge discharge device for a square settling tank includes a pulling barrel mechanism 1, a sludge scraping plate mechanism 4, a pulling weight 6, a perforated water-penetrating plate structure 7 and a floating sludge discharge structure 8, wherein the perforated water-penetrating plate structure 7 is disposed around the inner wall of the square settling tank, and the lower part of the perforated water-penetrating plate structure 7 is uniformly provided with drain holes 7.1; the sludge scraping plate mechanism 4 spans over the perforated drain plate; the pulley block 3 is disposed on two sides of the square settling tank, and the pulling barrel mechanism 1 is connected with a pulling rope A 2 which is wound through the pulley block 3 on one side and then is connected with the sludge scraping plate mechanism; the sludge scraping plate mechanism 4 is fixedly connected with a pulling rope B 5 which is wound through the pulley block 3 on the other side and then is connected with the pulling weight 6, such that the pulling barrel mechanism 1 and the pulling weight 6 are respectively disposed on two sides of the square settling tank.

The floating sludge discharge structure 8 is disposed on the side, close to the pulling barrel mechanism 1, of the perforated water-penetrating plate structure 7, effluent in the secondary settling tank flows into the pulling barrel mechanism 1, and when the weight of the pulling barrel mechanism 1 is greater than that of the pulling weight 6, effluent in the pulling barrel mechanism 1 is drained out of the pulling barrel mechanism 1 to realize the back-and-forth movement of the sludge scraping plate mechanism 4 and scrape floating sludge into the floating sludge discharge structure 8, wherein settlement supernatant flows out through the drain holes 7.1 below the liquid level of the perforated water-penetrating plate structure 7.

Figure 2:
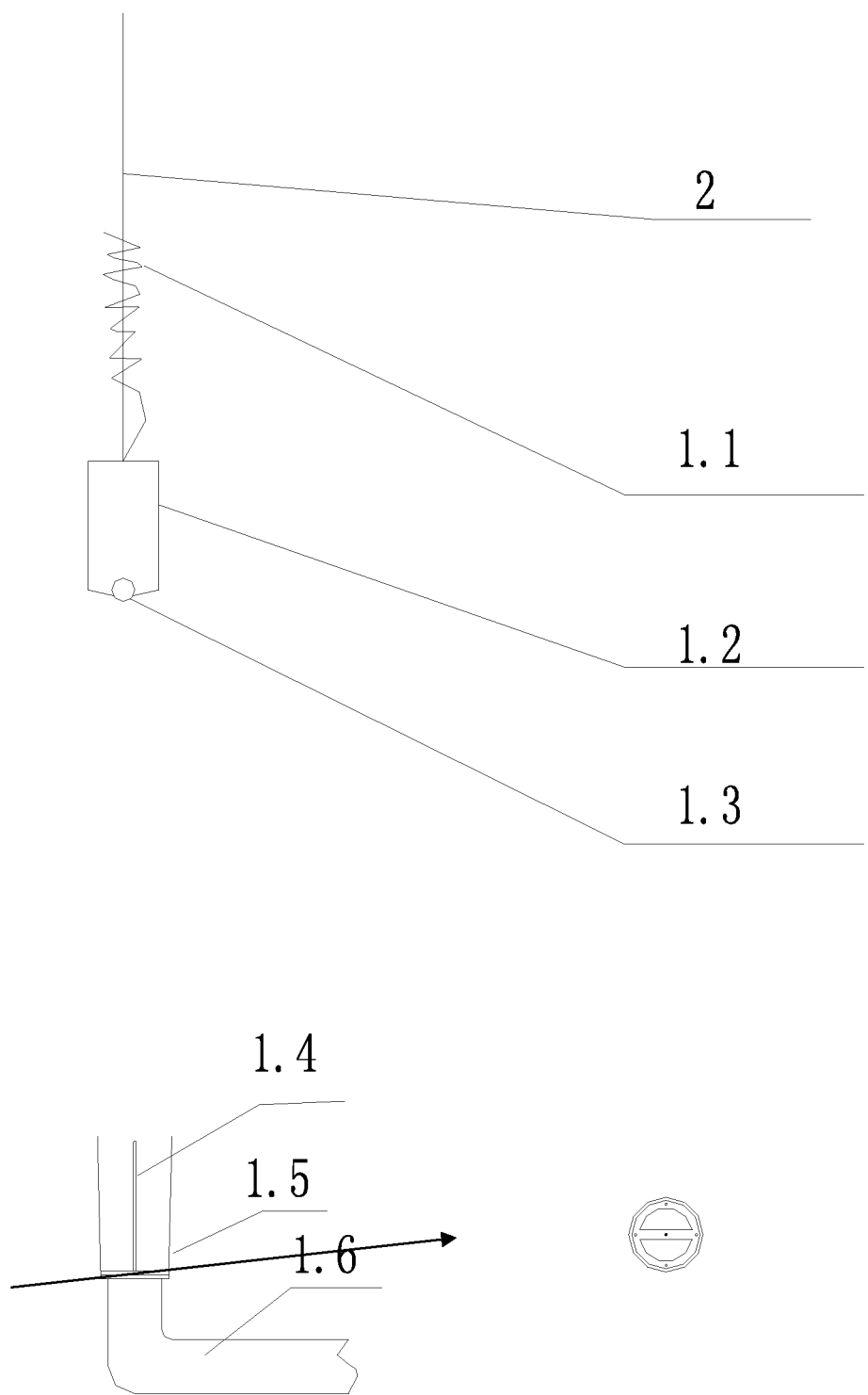
FIG. 2 is a structural schematic view of the pulling barrel mechanism of the present invention.
Figure 3:
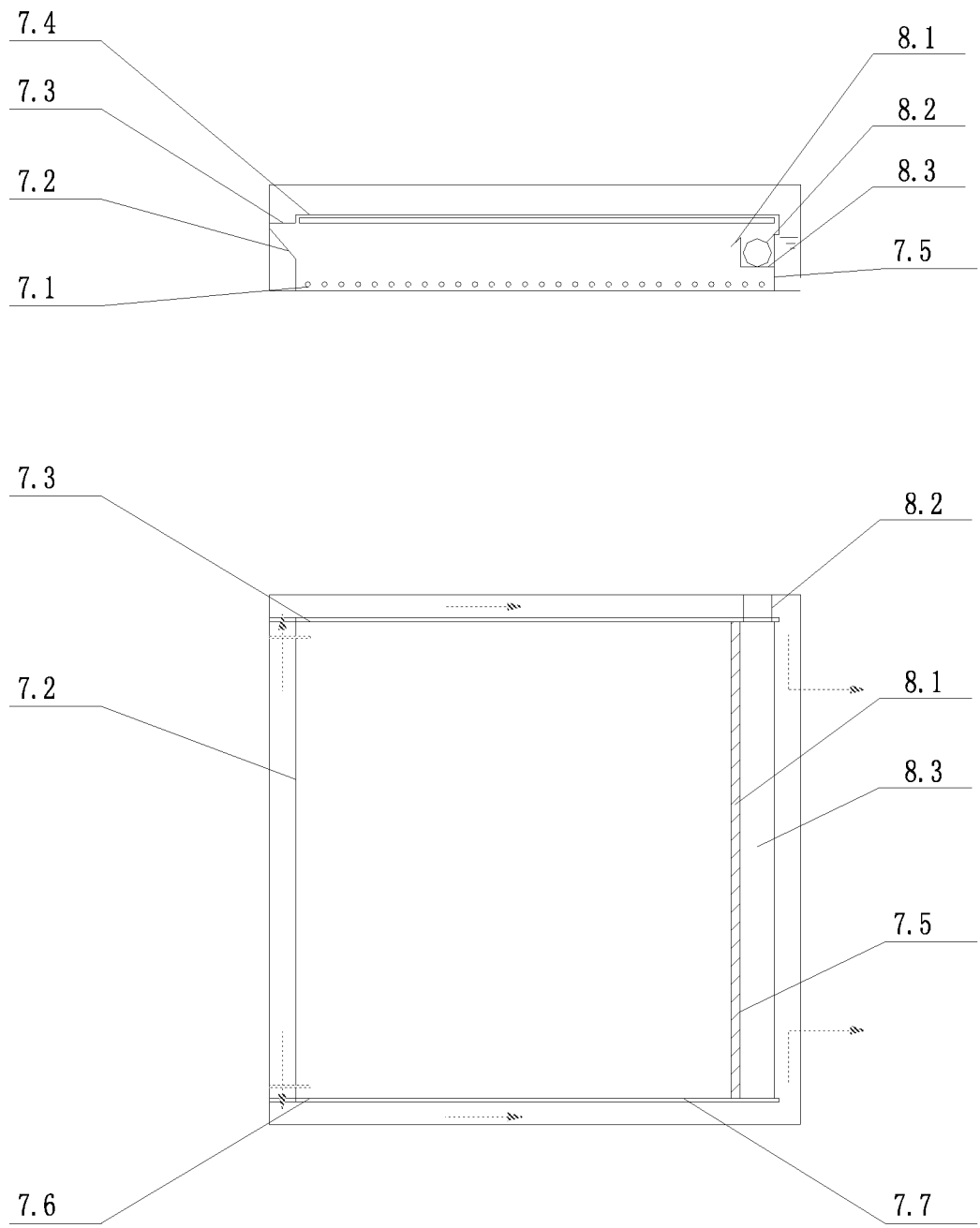
FIG. 3 is a structural schematic view of the perforated water-penetrating plate structure and floating sludge discharge structure of the present invention, wherein the upper view is a side view and the lower view is a top view.
Figure 4:
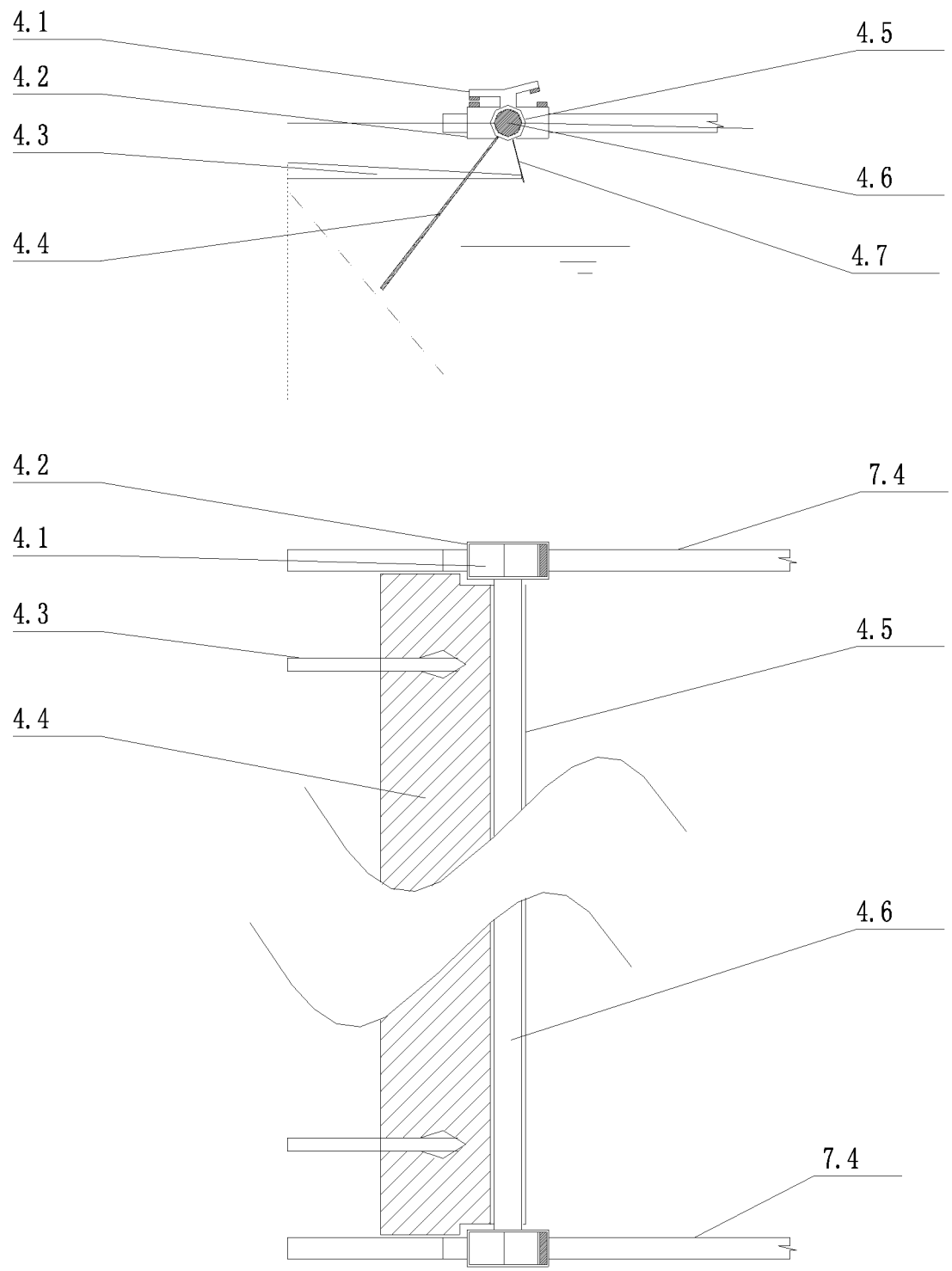
FIG. 4 is a planar schematic view of the sludge scraping plate mechanism of the present invention, wherein the upper view is a side view and the lower view is a top view.
Figure 5:
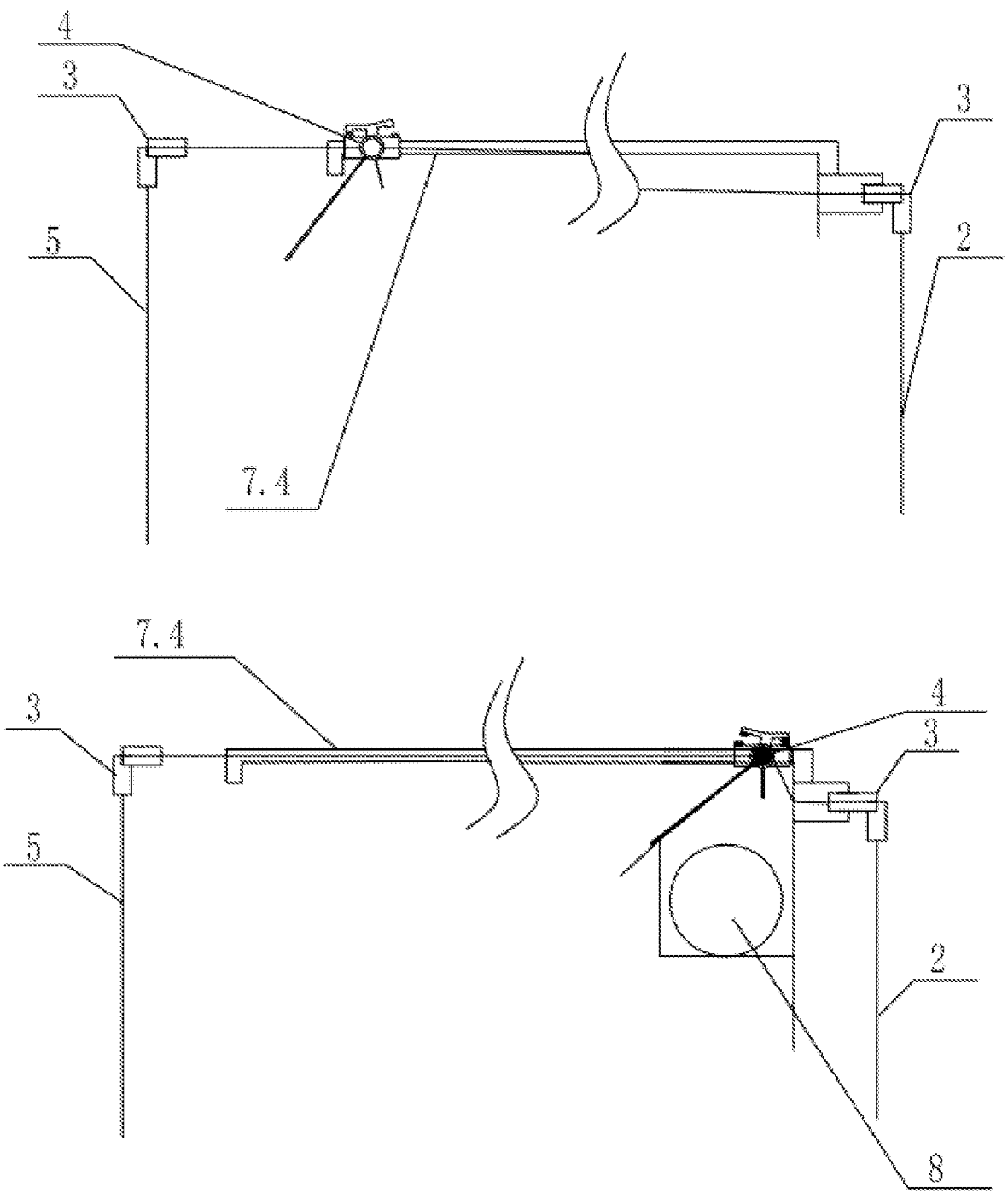
FIG. 5 is a schematic view of the action of the sludge scraping plate mechanism of the present invention.

Specifically, as illustrated in FIG. 2, the pulling barrel mechanism 1 consists of a spiral water pipe 1.1, a water storage barrel 1.2, a water stop ball 1.3, an ejector rod 1.4, a water receiving bucket 1.5 and a drain pipe 1.6; one end of the spiral water pipe 1.1 is connected with the upper part of the water storage barrel 1.2, the other end extends to the bottom of the perforated water-penetrating plate structure 7, and the effluent in the secondary settling tank flows into the water storage barrel 1.2 through the spiral water pipe 1.1; the bottom of the water storage barrel is a conical bottom, the conical bottom is provided with a circular hole, the diameter of the water stop ball 1.3 is larger than the diameter of the circular hole, and the water stop ball covers the circular hole; the water receiving bucket 1.5 is disposed below the water storage barrel, and the drain pipe 1.6 is communicated with the water receiving bucket 1.5 and is disposed below the water receiving bucket 1.5; the ejector rod 1.4 is disposed in the middle of the bottom of the water receiving bucket 1.5 and directly faces the circular hole in the bottom of the water storage barrel 1.2; the effluent in the secondary settling tank flows into the water storage barrel 1.2 through the spiral water pipe 1.1, when the weight of the water storage barrel 1.2 is greater than that of the pulling weight 6, the water storage barrel 1.2 moves slowly downwards until the ejector rod 1.4 ejects away the water stop ball 1.3, the water in the water storage barrel 1.2 is rapidly drained into the water receiving bucket 1.5 and is drained into a regulating tank at the front end of a sewage treatment process through the drain pipe 1.6, and the water storage barrel 1.2 moves rapidly upwards to realize actions that the sludge scraping plate slowly scrapes sludge and rapidly returns to a starting position, wherein the upward and downward movement frequency of the water storage barrel 1.2 depends on the flow rate of the spiral water pipe 1.1. The drain pipe 1.6 and the water receiving bucket 1.5 are connected through a flange, the ejector rod 1.4 is in the middle of the water receiving bucket 1.5, and circular flange bolt holes are disposed around.

The perforated water-penetrating plate structure 7 comprises an inclined stand plate 7.2, a first stand plate 7.3, a first stand plate guide rail 7.4, a second stand plate 7.5, a third stand plate 7.6 and a third stand plate guide rail 7.7, wherein the inclined stand plate 7.2, the first stand plate 7.3, the second stand plate 7.5 and the third stand plate 7.6 sequentially surround the inner wall of the square settling tank and are fixedly connected with the tank wall of the square settling tank through a flat plate in a horizontal direction, uniformly distributed drain holes 7.1 are disposed in the lower part of each stand plate and have a diameter of 6-10 mm, the first stand plate guide rail 7.4 and the third stand plate guide rail 7.7 are respectively fixed above the first stand plate 7.3 and the third stand plate 7.6, and the guide rails are square to facilitate load bearing and movement of the sludge scraping plate mechanism 4;

the sludge scraping plate mechanism 4 comprises a double-limiting upper magnet arm 4.1, double-line sliding cylinders 4.2, a double-limiting ejector rod 4.3, a sludge scraping plate 4.4, a rotating sleeve 4.5, a fixed shaft 4.6 and a double-limiting lower swing arm 4.7, wherein:

the number of the double-line sliding cylinders 4.2 are two, the two double-line sliding cylinders 4.2 are square and respectively sleeve the first stand plate guide rail 7.4 and the third stand plate guide rail 7.7, the two double-line sliding cylinders 4.2 are fixedly connected with each other through the fixed shaft 4.6, the rotating sleeve 4.5 sleeves the fixed shaft 4.6, the double-limiting lower swing arm 4.7 and the double-limiting upper magnet arm 4.1 are respectively fixed at the two ends of the rotating sleeve 4.5, the sludge scraping plate 4.4 is disposed in the middle of the rotating sleeve 4.5, the double-limiting ejector rod 4.6 is fixed on the tank wall and penetrates through the sludge scraping plate 4.4 through a perforation hole disposed in the surface of the sludge scraping plate 4.4, the double-limiting upper magnet arm 4.1 is of a special-shaped T-shaped structure, the two ends of the T-shaped structure are respectively provided with a magnet, and magnets whose polarity is opposite to that of the magnets at the two ends of the T-shaped structure are also disposed at corresponding positions of the double-line sliding cylinders; the double-limiting lower swing arm and the double-limiting upper magnet arm are used for limiting the position of the sludge scraping plate, the sludge scraping plate is kept in a downward swinging state at a starting end and is lifted up slowly until it moves to the floating sludge guide plate, while moving towards the direction of the double-limiting ejector rod, the sludge scraping plate is kept in a lifted-up state, and while reaching the double-limiting ejector rod, the sludge scraping plate is downwards pressed and is kept in the downward swinging state;

at the starting position, the sludge scraping plate is on the side far away from the floating sludge discharge structure 8, the double-limiting ejector rod 4.3 pushes the double-limiting lower swing arm 4.7, the double-limiting upper magnet arm 4.1 attracts the corresponding magnet right below, the sludge scraping plate 4.4 rotates anticlockwise, the stretching-out end of the sludge scraping plate goes deep into the liquid level, when the water storage barrel 1.2 moves slowly downwards, the sludge scraping plate 4.4 is pulled to scrape the floating sludge towards one side of the floating sludge discharge structure 8, when approaching a floating sludge guide plate 8.1, the sludge scraping plate 4.4 conveys the floating sludge to the floating sludge guide plate 8.1 to force the floating sludge to enter the floating sludge discharge trough 8.3, meanwhile, the upwards inclined floating sludge guide plate 8.1 lifts up the sludge scraping plate 4.4, the sludge scraping plate 4.4 rotates clockwise to force the rotating sleeve 4.5 and the double-limiting upper magnet arm 4.1 to rotate clockwise, when the sludge scraping plate 4.4 is just on the upper edge of the floating sludge discharge trough, the magnet at the other end of the double-limiting upper magnet arm 4.1 attracts the corresponding magnet on the double-line sliding cylinder, and at this moment the stretching-out end of the sludge scraping plate is 2-3 cm far away from the design liquid level; and the water in the water storage barrel 1.2 is emptied, the water storage barrel is pulled by the weight 6 to move upwards rapidly, the sludge scraping plate mechanism 4 quickly floats back from the floating sludge discharge trough 8.3, and when the sludge scraping plate mechanism 4 reaches the other end, the double-limiting ejector rod 4.3 pushes the double-limiting lower swing arm 4.7, and the sludge scraping plate mechanism returns to the starting position.

The floating sludge discharge structure 8 comprises a floating sludge guide plate 8.1, a floating sludge discharge pipe 8.2 and a floating sludge discharge trough 8.3, the floating sludge discharge trough 8.3 is fixed above the corresponding drain holes of the perforated water-penetrating plate structure 7, the upper edge of the floating sludge discharge trough 8.3 is 2-3 cm higher than the design liquid level of the secondary settling tank, the floating sludge guide plate 8.1 is an oblique plate, one side is below the design liquid level, and the other side is fixed on the upper edge of the floating sludge discharge trough 8.3 to guide the floating sludge into the floating sludge discharge trough 8.3, and the floating sludge flows out of the floating sludge discharge pipe 8.2 due to dead weight and enters a sludge storage tank.

Figure 6:
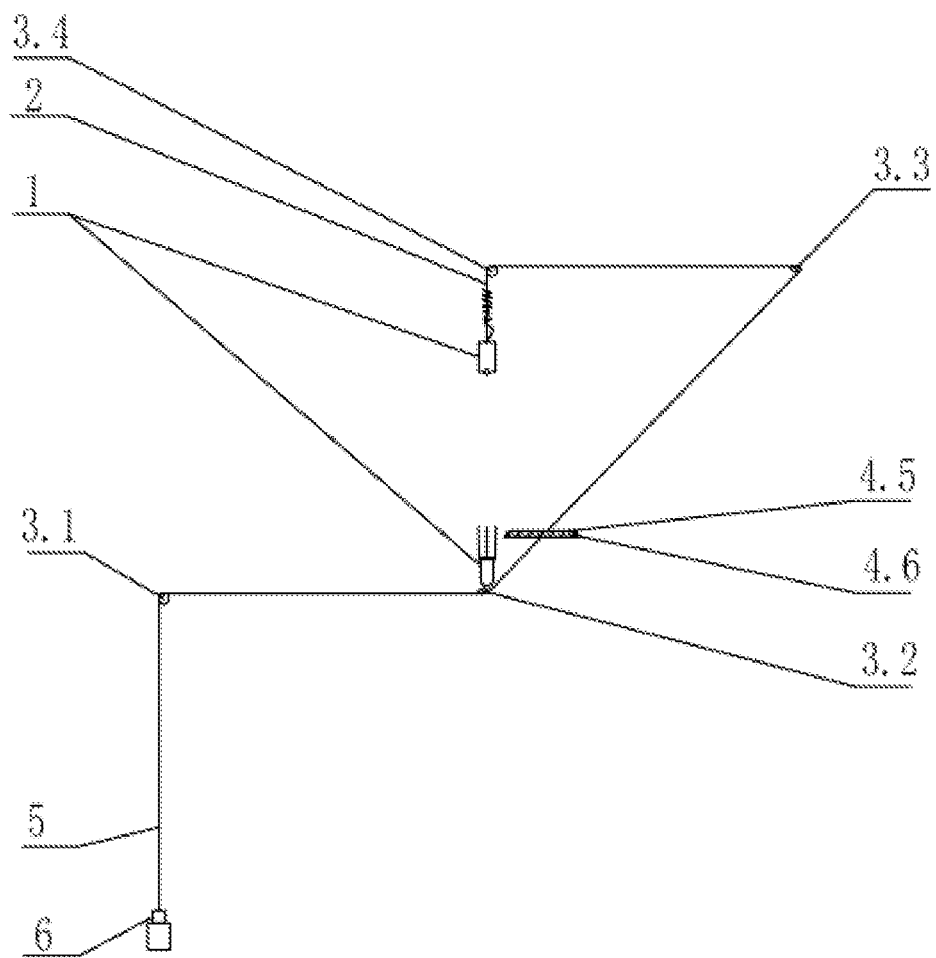
FIG. 6 is a view of a position relationship between the pulley block weight and the pulling barrel of the present invention.

As illustrated in FIG. 6, the pulley block 3 comprises an outer wall weight-side horizontal-shaft fixed pulley 3.1, a water inlet-side vertical-shaft fixed pulley 3.2, a water outlet vertical-shaft fixed pulley 3.3 and an outer wall pulling barrel-side horizontal-shaft fixed pulley 3.4, wherein the water inlet-side vertical-shaft fixed pulley 3.2 and the water outlet vertical-shaft fixed pulley 3.3 are respectively fixed at middle positions above the inclined stand plate 7.2 and the second stand plate 7.5, so as to ensure that the pulling rope pulls the center position of the fixed shaft to control the pulling rope at the center position of the plane of a tank body and ensure that the fixing point of the pulling rope on the shaft is the center position of the shaft; the outer wall weight-side horizontal-shaft fixed pulley 3.1 and the outer wall pulling barrel-side horizontal-shaft fixed pulley 3.4 are respectively fixed on the outer wall of the square tank, located above the perforated water-penetrating plate structure 7 and are used for pulling the sludge scraping plate to move back and forth.

Figure 7:
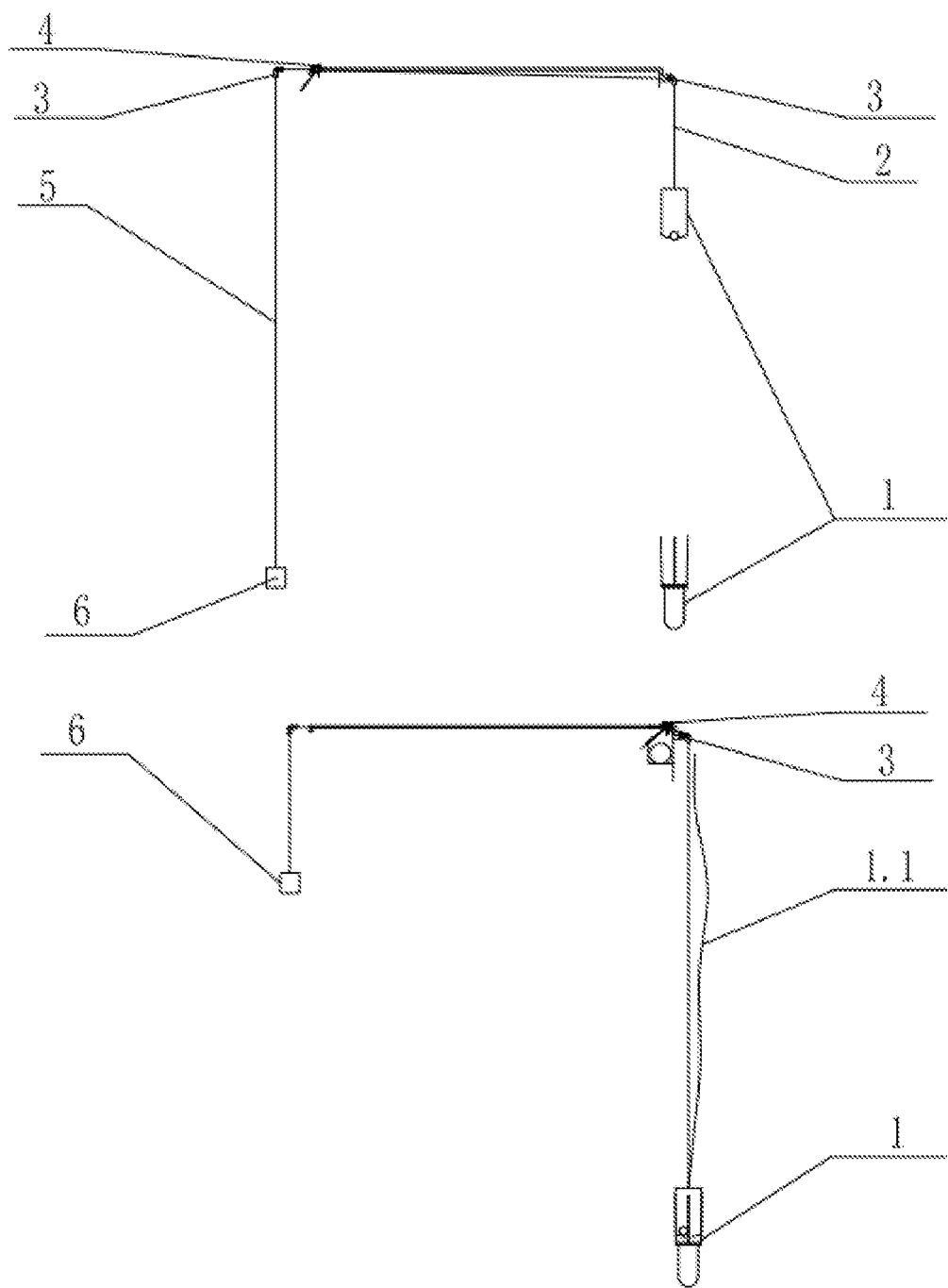
FIG. 7 is a schematic view of the action principle of the sludge scraping plate of the present invention.

As illustrated in FIG. 7, a sludge scraping process is as follow:

When the secondary settling tank has effluent, the effluent enters the water storage barrel 1.2, and the liquid in the water storage barrel 1.2 gradually increases. When the weight of the pulling barrel mechanism 1 is larger than the weight of the weight 6, the water storage barrel 1.2 pulls the sludge scraping plate 4.4 to move slowly to one side of the floating sludge discharge trough 8.3, when approaching the floating sludge discharge trough 8.3, the sludge scraping plate 4.4 is jacked by the floating sludge guide plate 8.1, the sludge scraping plate 4.4 is lifted up to drive the double-limiting upper magnet arm 4.1 to rotate, approaches and attracts the lower magnet, and then is fixed, and the sludge scraping process is completed. At this moment, the sludge scraping plate 4.4 is in a lifted-up state, the floating sludge is scraped into the floating sludge discharge trough 8.3, the water stop ball 1.3 of the water storage barrel 1.2 has been ejected away, the liquid leaks rapidly into the water receiving bucket 1.5, and at this moment, the pulling force of the pulling barrel mechanism is exactly equal to the pulling force of the weight 6.

A returning process is as follow:

When the water stop ball 1.3 is ejected away, the weight of the pulling barrel mechanism gradually decreases to be less than the weight of the weight 6, the water storage barrel 1.2 is ready to move upwards, at this moment the vertical long rod still ejects away the ball, the liquid is still leaking rapidly, the water storage barrel 1.2 continues to lose the weight of the liquid rapidly until the liquid is emptied, the sludge scraping plate 4.4 is quickly pulled near the starting position by weight 6, when the sludge scraping plate 4.4 approaches the inclined stand plate 7.2, the double-limiting ejector rod 4.3 fixed on the wall of the secondary settling tank pushes the double-limiting lower swing arm 4.7, the double-limiting lower swing arm 4.7 drives the double-limiting upper magnet arm 4.1 fixed on the rotating sleeve 4.5 to rotate, the magnet on the double-limiting upper magnet arm 4.1 is close to and attracts the magnet below, the sludge scraping plate 4.4 is restricted from swinging downwards and returns to the sludge scraping state, and the returning process ends.

What is claimed is:

1. A floating sludge discharge device for a square settling tank, comprising a pulling barrel mechanism, a sludge scraping plate mechanism, a pulling weight, a perforated water-penetrating plate structure and a floating sludge discharge structure, wherein,
    the perforated water-penetrating plate structure is disposed around an inner wall of a square settling tank, and a lower part of the perforated water-penetrating plate structure is uniformly provided with drain holes;
    the sludge scraping plate mechanism spans over the perforated water-penetrating plate structure;
    a pulley block is disposed on two sides of the square settling tank, and the pulling barrel mechanism is connected with a pulling rope A which is wound through the pulley block on one side and then is connected with the sludge scraping plate mechanism;
    the sludge scraping plate mechanism is fixedly connected with a pulling rope B which is wound through the pulley block on an other side and then is connected with the pulling weight, such that the pulling barrel mechanism and the pulling weight are disposed on two sides of the square settling tank, respectively;
    the floating sludge discharge structure is disposed on the side, close to the pulling barrel mechanism, of the perforated water-penetrating plate structure, effluent in a secondary settling tank flows into the pulling barrel mechanism, and when the weight of the pulling barrel mechanism is greater than that of the pulling weight, the effluent in the pulling barrel mechanism is drained out of the pulling barrel mechanism to result in the back-and-forth movement of the sludge scraping plate mechanism which scrapes floating sludge into the floating sludge discharge structure, and settlement supernatant flows out through the drain holes.

2. The floating sludge discharge device for the square settling tank according to claim 1, wherein the pulling barrel mechanism comprises a spiral water pipe, a water storage barrel, a water stop ball, an ejector rod, a water receiving bucket and a drain pipe; one end of the spiral water pipe is connected with an other part of the water storage barrel, the other end of the spiral water pipe extends to the bottom of the perforated water-penetrating plate structure, and the effluent in the secondary settling tank flows into the water storage barrel through the spiral water pipe; the bottom of the water storage barrel is a conical bottom, the conical bottom is provided with a circular hole, the diameter of the water stop ball is larger than the diameter of the circular hole and the water stop ball covers the circular hole; the water receiving bucket is disposed below the water storage barrel, and the drain pipe is communicated with the water receiving bucket and is disposed below the water receiving bucket; the ejector rod is disposed in the middle of the bottom of the water receiving bucket and directly faces the circular hole in the bottom of the water storage barrel; the effluent in the secondary settling tank flows into the water storage barrel through the spiral water pipe, when the weight of the water storage barrel is greater than that of the pulling weight, the water storage barrel moves slowly downwards until the ejector rod ejects away the water stop ball, the water in the water storage barrel is rapidly drained into the water receiving bucket and is drained into a regulating tank at the front end of a sewage treatment process through the drain pipe, and the water storage barrel moves rapidly upwards to realize actions that the sludge scraping plate slowly scrapes sludge and rapidly returns to a starting position.

3. The floating sludge discharge device for the square settling tank according to claim 2, wherein the drain pipe and the water receiving bucket are connected through a flange, the ejector rod is in a middle of the water receiving bucket, and circular flange bolt holes are disposed around the water receiving bucket.

4. The floating sludge discharge device for the square settling tank according to claim 1, wherein the perforated water-penetrating plate structure comprises an inclined stand plate, a first stand plate, a first stand plate guide rail, a second stand plate, a third stand plate and a third stand plate guide rail, wherein the inclined stand plate, the first stand plate, the second stand plate and the third stand plate sequentially surround the inner wall of the square settling tank and are fixedly connected with tank wall of the square settling the tank through a flat plate in a horizontal direction; distributed drain holes are uniformly disposed in a lower part of each stand plate with a diameter of 6-10 mm, the first stand plate guide rail and the third stand plate guide rail are fixed above the first stand plate and the third stand plate, respectively, and the first and third stand plate guide rails are squared to facilitate load bearing and movement of the sludge scraping plate mechanism;

the sludge scraping plate mechanism comprises a double-limiting upper magnet arm, double-line sliding cylinders, a double-limiting ejector rod, a sludge scraping plate, a rotating sleeve, a fixed shaft and a double-limiting lower swing arm, wherein:

two double-line sliding cylinders forms a square shape and sleeve the first stand plate guide rail and the third stand plate guide rail, respectively, the two double-line sliding cylinders are fixedly connected with each other through the fixed shaft, the rotating sleeve sleeves the fixed shaft, the double-limiting lower swing arm and the double-limiting upper magnet arm are fixed at two ends of the rotating sleeve, respectively, the sludge scraping plate is disposed in a middle of the rotating sleeve, the double-limiting ejector rod is fixed on the tank wall of the sludge scraping plate and penetrates through the sludge scraping plate through a perforation hole disposed in a surface of the sludge scraping plate, the double-limiting upper magnet arm is of a special-shaped T-shaped structure, two ends of the T-shaped structure are provided with a magnet, respectively, and two magnets whose polarity is opposite to each other, the two ends of the T-shaped structure are also disposed at corresponding positions of the double-line sliding cylinders;

at a starting position, the sludge scraping plate is on one far side of the floating sludge discharge structure, the double-limiting ejector rod pushes the double-limiting lower swing arm, the double-limiting upper magnet arm attracts the corresponding magnet right below, the sludge scraping plate rotates anticlockwise, stretching-out end of the sludge scraping plate goes deep into the liquid level, when the water storage barrel moves slowly downwards, the sludge scraping plate is pulled to scrape the floating sludge towards one side of a floating sludge discharge structure, when approaching a floating sludge guide plate, the sludge scraping plate conveys the floating sludge to the floating sludge guide plate to force the floating sludge to enter the floating sludge discharge trough, meanwhile, the upwards inclined floating sludge guide plate lifts up the sludge scraping plate, the sludge scraping plate rotates clockwise to force the rotating sleeve and the double-limiting upper magnet arm to rotate clockwise, when the sludge scraping plate is just on an upper edge of the floating sludge discharge trough, the magnet at other end of the double-limiting upper magnet arm attracts a corresponding magnet on the double-line sliding cylinder, and at this moment the stretching-out end of the sludge scraping plate is 2-3 cm far away from a design liquid level; and the water storage barrel is emptied, the water storage barrel is pulled by the pulling weight to move upwards rapidly, the sludge scraping plate mechanism quickly floats back from the floating sludge discharge trough-, and when the sludge scraping plate mechanism reaches another end of the floating sludge discharge trough, the double-limiting ejector rod pushes the double-limiting lower swing arm, and the sludge scraping plate mechanism returns to the starting position.

5. The floating sludge discharge device for the square settling tank according to claim 1, wherein the floating sludge discharge structure comprises a floating sludge guide plate, a floating sludge discharge pipe and a floating sludge discharge trough, the floating sludge discharge trough is fixed above the drain holes of the perforated water-penetrating plate structure, the upper edge of the floating sludge discharge trough is 2-3 cm higher than a design liquid level of the secondary settling tank, the floating sludge guide plate is an oblique plate, one side of the floating sludge guide plate is below the design liquid level, and the other side of the floating sludge guide plate is fixed on the upper edge of the floating sludge discharge trough to guide a floating sludge into the floating sludge discharge trough, and the floating sludge flows out of the floating sludge discharge pipe and enters a sludge storage tank.

6. The floating sludge discharge device for the square settling tank according to claim 5, wherein an inclination angle of the floating sludge guide plate is 30-45°.

7. The floating sludge discharge device for the square settling tank according to claim 1, wherein the pulley block comprises an outer wall weight-side horizontal-shaft fixed pulley, a water inlet-side vertical-shaft fixed pulley, a water outlet vertical-shaft fixed pulley and an outer wall pulling barrel-side horizontal-shaft fixed pulley, wherein the water inlet-side vertical-shaft fixed pulley and the water outlet vertical-shaft fixed pulley are fixed at middle positions above the inclined stand plate and the second stand plate, respectively, which ensures that the pulling rope pulls a center position of a fixed shaft to control the pulling rope at center position of the plane of a tank body and fixing point of the pulling rope on a shaft is center position of the shaft; the outer wall weight-side horizontal-shaft fixed pulley and the outer wall pulling barrel-side horizontal-shaft fixed pulley are fixed on outer wall of a square tank that is located above the perforated water-penetrating plate structure and are used for pulling the sludge scraping plate to move back and forth.

* * * * *